(12) United States Patent
Trantham (10) Patent No.: US 10,731,871 B2
(45) Date of Patent: Aug. 4, 2020

(54) RETROFIT SMART COMPONENTS FOR USE IN A FLUID TRANSFER SYSTEM

(71) Applicant: IMI HYDRONIC ENGINEERING, INC., Dallas, TX (US)

(72) Inventor: John M. Trantham, Hurst, TX (US)

(*) Notice: Subject to any disclaimer, the term of this patent is extended or adjusted under 35 U.S.C. 154(b) by 0 days.

(21) Appl. No.: 15/908,721

(22) Filed: Feb. 28, 2018

(65) Prior Publication Data

US 2019/0011135 A1 Jan. 10, 2019

Related U.S. Application Data

(63) Continuation of application No. 14/660,347, filed on Mar. 17, 2015, now Pat. No. 9,933,167.

(60) Provisional application No. 61/955,064, filed on Mar. 18, 2014.

(51) Int. Cl.
*F24D 19/10* (2006.01)
*G05D 23/19* (2006.01)

(52) U.S. Cl.
CPC ..... *F24D 19/1015* (2013.01); *G05D 23/1931* (2013.01)

(58) Field of Classification Search
CPC .............. F24D 19/1015; G05D 23/00
See application file for complete search history.

(56) References Cited

U.S. PATENT DOCUMENTS

| | | | |
|---|---|---|---|
| 2008/0032705 A1* | 2/2008 | Patel | H04W 4/18 455/456.1 |
| 2009/0314484 A1* | 12/2009 | Barrett | G05D 23/192 165/293 |
| 2014/0326796 A1* | 11/2014 | Kymissis | F24D 19/0087 237/12 |

* cited by examiner

*Primary Examiner* — Christopher E. Everett (57) ABSTRACT

According to an embodiment of the disclosure, a retrofit for a system using a fluid to transfer thermal energy in a system that utilizes a thermostat to regulate a temperature associated with a terminal is provided. The retrofit includes a return line temperature sensor configured to measure a temperature of a fluid leaving a terminal; and a circuit. The circuit is configured to: receive a signal from a thermostat, the signal commanding a modulated valve to open or close; receive a temperature from the return line temperature sensor; determine whether the temperature is either greater than a maximum set point or less than a minimum set point; and modify the signal from the thermostat if the temperature is either greater than the set point or less than set point.

11 Claims, 4 Drawing Sheets

RETROFIT SMART COMPONENTS FOR USE IN A FLUID TRANSFER SYSTEM

CROSS-REFERENCE TO RELATED APPLICATIONS

The present application is a continuation of U.S. application Ser. No. 14/660,347 filed on Mar. 17, 2015, which claims the benefit of U.S. Provisional Patent Application No. 61/955,064, which was filed on Mar. 18, 2014. Each of the above-referenced applications are incorporated by reference for all purposes.

TECHNICAL FIELD

This disclosure is generally directed to valve systems. More specifically, this disclosure is directed to retrofit smart components for use in a fluid transfer system.

BACKGROUND

Buildings often utilizes fluid systems to transfer thermal energy either to or from rooms in the building. One non-limiting example of such a system is a hydronic system. Such fluid systems often use thermostats to regulate the amount of flow to a terminal associated with the room—with the goal of regulating the temperature of the room. However, there is a problem with this approach. Thermostats operate in an uninformed manner in that they only measure the temperature of the room and not the heating or cooling capacity of the fluid. Stated differently, thermostats disregard and are unaware of thermal energy in the fluid.

In addition, malfunctions in such systems are often difficult to diagnose because one part of the system affects another, and terminals are often difficult to access and measure.

BRIEF DESCRIPTION OF THE DRAWINGS

For a more complete understanding of this disclosure and its features, reference is now made to the following description, taken in conjunction with the accompanying drawings, in which.

SUMMARY OF THE DISCLOSURE

According to an embodiment of the disclosure, a retrofit for a system using a fluid to transfer thermal energy in a system that utilizes a thermostat to regulate a temperature associated with a terminal is provided. The retrofit includes a return line temperature sensor configured to measure a temperature of a fluid leaving a terminal; and a circuit. The circuit is configured to: receive a signal from a thermostat, the signal commanding a modulated valve to open or close; receive a temperature from the return line temperature sensor; determine whether the temperature is either greater than a set point or less than the set point; and modify the signal from the thermostat if the temperature is either greater than the set point or less than set point.

According to another embodiment of the disclosure, an ad-hoc network for use in a system using a fluid to transfer thermal energy is provided. The ad-hoc network includes: a plurality of nodes that are associated with at least a sensor configured to measure a temperature of the fluid or a unit configured to signal a valve to open or close. Each of the nodes are configured to: communicate with one or more of the plurality of nodes; communicate information received or gathered concerning an operation of the system to at least one other node. At least one of the nodes is configured to transfer all the information gathered by the plurality of nodes to a location outside of the ad-hoc network.

According to yet another embodiment of the disclosure, a circuit in a system using a fluid to transfer thermal energy having modulated valves controlling a flow of fluid from terminals is provided. The circuit includes one or more modules. The one or modules are configured to: receive a temperature from a return line temperature sensor configured to measure a temperature of a fluid leaving a terminal; allow a signal to be sent to the modulated control valve to open or close based on the received temperature; and communicate information concerning an operation of the circuit wirelessly to a first neighboring adjacent circuit.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The phrase "at least one of," when used with a list of items, means that different combinations of one or more of the listed items may be used, and only one item in the list may be needed. For example, "at least one of: A, B, and C" includes any of the following combinations: A; B; C; A and B; A and C; B and C; and A and B and C. Definitions for certain words and phrases are provided throughout this patent document, those of ordinary skill in the art should understand that in many if not most instances, such definitions apply to prior, as well as future uses of such defined words and phrases.

DETAILED DESCRIPTION

The FIGURES described below, and the various embodiments used to describe the principles of the present disclosure in this patent document are by way of illustration only and should not be construed in any way to limit the scope of the disclosure. Those skilled in the art will understand that the principles of the present disclosure invention may be implemented in any type of suitably arranged device or system. Additionally, the drawings are not necessarily drawn to scale.

Buildings often utilizes fluid systems to transfer thermal energy either to or from rooms in the building. One non-limiting example of such a system is a hydronic system. Such fluid systems often use thermostats to regulate the amount of flow to a terminal associated with the room—with the goal of regulating the temperature of the room. However, there is a problem with this approach. Thermostats operate in an uninformed manner in that they only measure the temperature of the room and not the heating or cooling capacity of the fluid. Stated differently, thermostats disregard and are unaware of thermal energy in the fluid.

Such fluid systems can operate in a more efficient manner with a building management system employing special logic and water temperature controls; however, the cost of such a building management system may be excessive in many cases. As yet a different approach, enhanced control valves that consider heating and cooling capacity may be used; however, in certain situations, it may not be possible to utilize such enhanced control valves due to among other things, the cost to remove and replace existing equipment.

In addition to the above concerns, yet even additional concern arise from anecdotal "ghosts" that exists in the fluid systems of buildings. These phenomena are anecdotally referred to as ghosts because they are unknown inefficiencies in the fluid system that cannot be reliably detected.

Given such concerns, certain embodiment of the disclosure provide a retrofit to existing system designs to effectively allow more informed decisions on, among other things, the opening and closing of valves. Additionally, certain embodiments, allow an ad-hoc communications of components for, among things, diagnostics and detection of problems. With such diagnosis and detection of problems, the fluid system is capable of being corrected—allowing a more efficient (and, hence, less costly) system.

Figure 1:
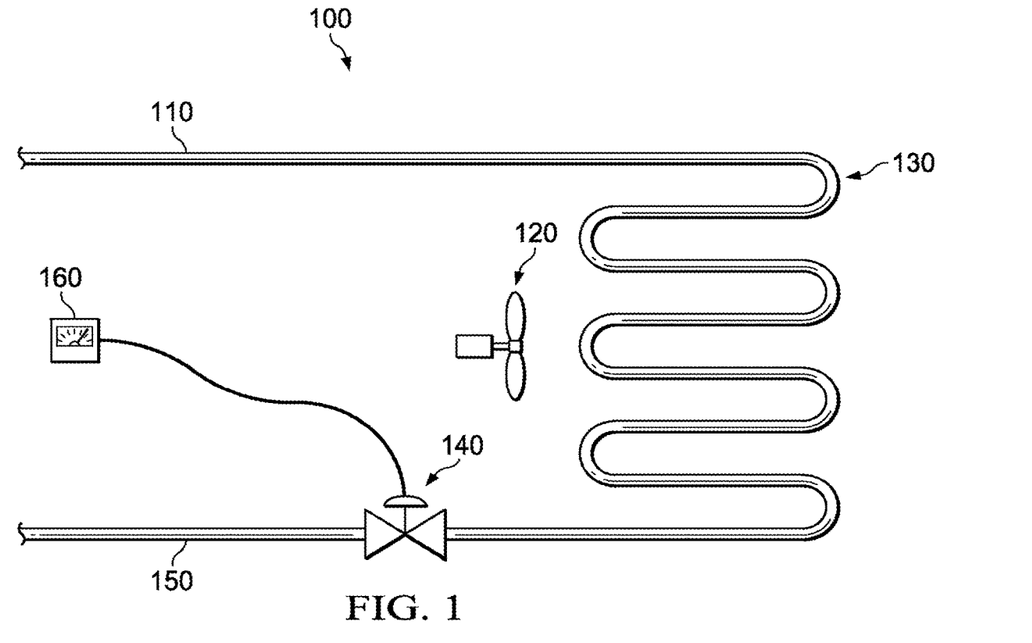
FIG. 1 is an example of an existing system in which embodiments of the disclosure may be implemented.

FIG. 1 is an example of an existing system 100 in which embodiments of the disclosure may be implemented. For purposes of illustration, the system 100 will be described as a portion of a hydronic heating or cooling system, which may be used to heat or cool rooms in a building. While such a specific system 100 will be described, it should be understood that embodiments of the disclosure may be used in conjunction with other systems (some of which will be referenced below). Additionally, although specific components will be described with reference to system 100, it should be understood that other systems may have more, fewer, or different components parts.

The system 100 in FIG. 1 corresponds to a portion of a larger hydronic system used to cool or heat a particular room or set of rooms. One of ordinary skill in the art having read this specification will recognize that multiple systems 100 like that shown in FIG. 1 are utilized for each respective room or set of rooms in a building.

The system 100 of FIG. 1 generally includes a supply line 110, a fan 120, a coil 130, a modulated valve component 140, a return line 150, and a thermostat 160. In operation, fluid is transferred through the supply line—the temperature of which is dependent on whether a heating or cooling operation occurs. The fan 120 blows air across the coils 130 to transfer thermal energy to or from the room. Based on temperature of the room or set of rooms the system 100 is serving and a set temperature, the thermostat 160 transmits a signal (e.g., a voltage) to the modulated valve component 140 (which may include any suitable actuator and valve components) to either open or close the modulated valve component 140. In particular configurations, the thermostat 160 may also send a signal to the fan 120 to control the fan speed.

A variety of problem can occur in such an existing system, including those discussed above and for additional reasons discussed below.

Figure 2:
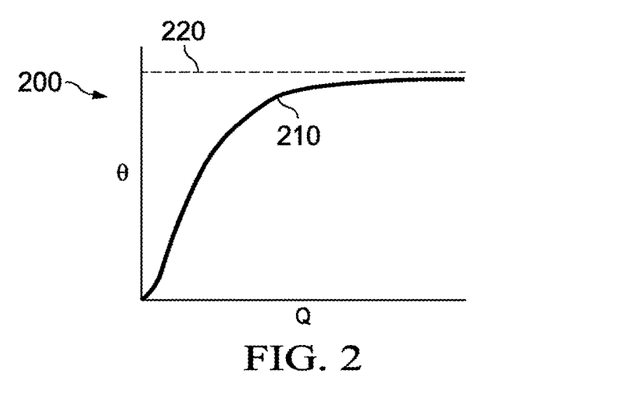
FIG. 2 shows a graph comparing a heat flux ($\Theta$) to a flow rate (Q)

FIG. 2 shows a graph 200 comparing a heat flux ($\Theta$) to a flow rate (Q). In providing or removing thermal energy from the room or set of rooms serviced by the system 100, the heat flux linearly increases at a fairly steep rate for low heat flux and flow amounts. When a saturation point is met (e.g., around point 210), the heat flux begins to become insensitive to changes in flow. Ultimately, the heat flux hovers just below the asymptotic maximum 220 with almost no change for changes in flow rate.

When the system 100 is operating at or to the right of the saturation point, an ineffective situation occurs. The opening or closing of the valve does little to change the heat flux; however, the system doesn't know that and may assume a grossly incorrect flow rates. This is because the system only measures room temperatures (via the thermostat) and modifies how open or close a valve should be based on this measurement alone.

As a simple example of the preceding, assume the pressure difference between the supply and return lines is much higher than expected. This results in more water flow for a given opening of the modulated valve component 140. The thermostat 160, unaware of such a scenario, seeks to cool the room and, accordingly, signals to open the modulated valve component 140 to its maximum where the flow through the modulated valve component 140 has entered into what is called an "overflow" scenario. At this point, for the given heat flux available, the modulated valve component 140 is likely operating well to the right of the saturation point 210 when it could be operating much further to the left—even to the left of the saturation point—with knowledge of the thermal energy in the supply line 110 and the return line 150.

Another problem that may occur in existing system 100 such as FIG. 1 can occur when an inappropriate temperature of the fluid is returned in the return line 150. As an example in cooling, the supply line may be 45 degrees and a desired temperature of the return line 150 may be in the range of 55 to 60 degrees. Returning temperatures warmer than this may result in moisture being placed into the room, while returning water colder than the desired range indicates wasted flow of cooling fluid to the terminal.

In a similar vein to the preceding paragraph, in certain scenarios, production equipment (e.g., boilers or chillers) may desire a certain temperature in the return line. As an example, systems with high mass boilers typically do not like return water being too cold. Conversely, condensing boilers operate most efficiently with lower temperature return water.

As indicated above, given such concerns, certain embodiment of the disclosure provide a retrofit to existing system designs to effectively allow more informed decisions on opening and closing of valves. In certain configurations, this retrofit may be a robust and cost-effective alternative to replacing existing equipment with more enhanced valve designs or a building management system with a multitude of sensors.

Additionally, as will be described below, in certain embodiments the anecdotal ghosts in a fluid system for a building can be detected—allowing a repair of the fluid system for more efficient operation. According to certain embodiments, such ghosts are detected through an ad-hoc communication of circuit or nodes.

Figure 3:
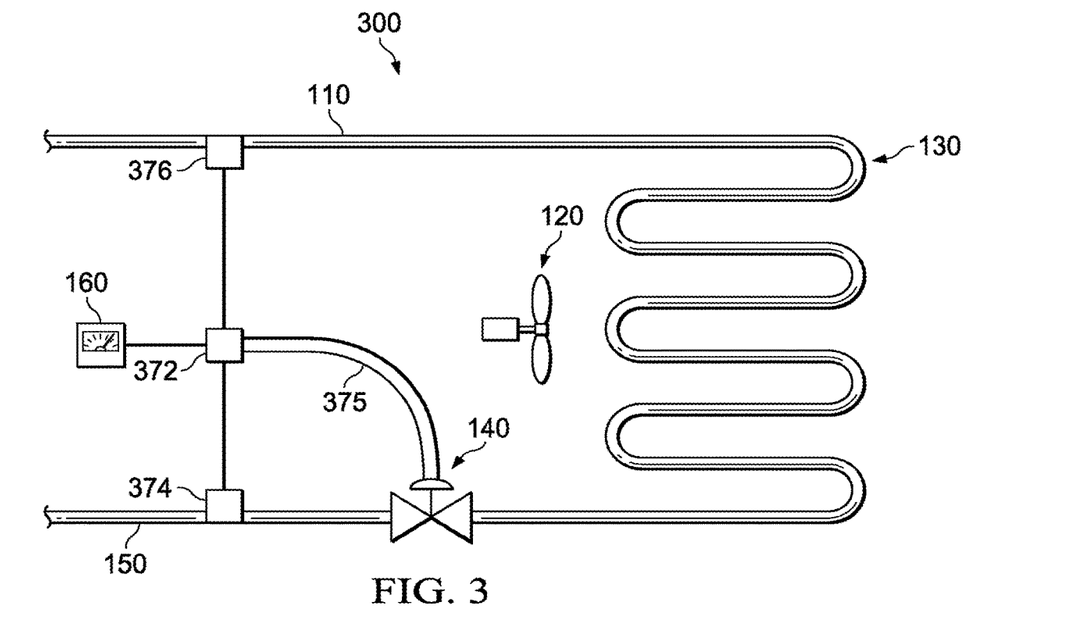
FIG. 3 shows a retrofitted system, according to an embodiment of the disclosure.

FIG. 3 shows a retrofit system 300, according to an embodiment of the disclosure. The retrofit system 300, in particular embodiments, takes the same features of the system 100 of FIG. 1, e.g., the supply line 110, the fan 120, the coil 130, the modulated valve component 140, the return line 150, and the thermostat 160 and adds select retrofit features. As shown, the retrofit system 300 also has a circuit 372, a return line sensor 374, and a supply line sensor 376. As will be described below, in certain embodiments, the circuit 372 may have simple or advanced diagnosis capabilities; accordingly, the complexity of the circuit can vary depending on configuration.

In particular embodiments, the retrofit components may allow a supplementation rather than a replacement of existing components in a fluid transfer system. However, in other embodiments where, for example, replacement is occurring already, smarter components may be utilized as will be described below.

Although certain embodiments of the disclosure may be described with reference to a hydronic system and particular components of the same used in the transfer of thermal energy, embodiments of the disclosure may also be utilized in other scenarios. As a non-limiting example, systems having refrigerants or other fluids for the transfer of thermal energy may avail from embodiments of the disclosure. Additionally, although FIG. 3 shows a variety of components, embodiments of the disclosure may use some, none, or all of these components. Moreover, while certain components (e.g., the circuit 372) have been described as having certain sub-components, such components may have some, none, or all of the sub-components described.

Depending on need and cost/benefit tradeoff, various configurations for embodiment are disclosed. Some provide simple, cost-conscious approaches. Some are more complex (and perhaps more costly); however, the efficiencies provided will offset the cost and pay for themselves over time.

At a very basic level, in particular configurations, the retrofit system 300 may only include the return line sensor 374 and the circuit 372. In such a configuration, the logic may be as simple as the following:

If $T_r < T_{r,min}$ or $T_r > T_{r,max}$,
then over-ride control signal to a more closed position,
else communicate control signal without modification where $T_r$ is the return temperatures measured from return line sensor 374, $T_{r,min}$ and $T_{r,max}$ are the respective hot and cold set point triggering modifications, and the control signal is the signal being sent by the thermostat 160. Alternatively stated, the circuit 372 steps in as an advisor to override the thermostat when the return temperature is too cold or too hot. Otherwise, the circuit 372 leaves the control signal alone.

In particular configurations, these hot and cold set points may be set specified by a customer. In other configurations, the hot and cold set points may be dynamically modified (as will be described in more detail below) to account for changing circumstances in the system. Although both hot and cold set points are provided, in certain configurations, only a hot set point or a cold set point may be utilized.

In the basic level configuration described above, the circuit 372 may be a simple four-bit processor and not include all the components described below with reference to more advanced configurations. For example, in particular configurations, the processor could be a 10 hertz processor or lower. In other configurations where the circuit 372 include more advanced operations, a more complex processing scheme (and faster processors) are utilized. For example, as will be described below, in particular configurations, the circuit 372 may include multiple processing loops—each with a particular purpose. However, again, depending on the desired configuration, a simple circuit with minimal features may provide all the efficiency gains a user might seek.

Although the circuit 372 is generally shown in FIG. 3 as separate from the thermostat 160 and modulated valve component 140, the circuit may be integrated into one or the other (or just a portion of such components such as the actuator portion or valve portion of the modulated valve component). In a scenario in which it is integrated into the modulated valve component 140 (or just a portion of such components such as the actuator portion or valve portion of the modulated valve component), the circuit 372 may be seen as an interceptor of incoming control signals into the modulated valve component 140 with selective modification based on its onboard logic. On the opposite side, on the thermostat 160, the circuit 372 may be seen as an interceptor of outgoing control signals into the modulated valve component 140 with selective modification based on its onboard logic. In configurations, in which it is integrated into one component or the other, a single component may only need be installed (in scenario where either the thermostat 160 or modulated valve component 140 are also being installed). Embodiments that might utilize an integrated design include those where, for example, a component is being replaced such as the modulated valve component 140.

As can be seen with a configuration such as this, the control is local as opposed to specifically communicating with a building management system for instructions on to how to proceed.

As a slightly more advanced design to the basic level configuration described above, the circuit 372 may receive information from an added supply line sensor 376. In scenarios in which the supply temperature is known, the hot set point and cold set points can be dynamically modified. As a non-limiting example, in a scenario where 200 degrees Fahrenheit fluid is seen in the supply line 110, a hot set point of 180 degrees Fahrenheit might be appropriate. However, where 175 degree Fahrenheit is seen in the supply line 110, a different hot set point might be appropriate. Yet other different limits can be used for yet different temperatures. And, such temperatures of the supply line 110 can, also, be used for the cold set point in particular temperatures.

The reason different set points are important can be seen with a simple illustration. Imagine a building with terminals receiving thermal energy from a boiler in series in a hydronic system. The first terminal may get the full temperature from the output of the boiler (e.g, 200 degrees Fahrenheit). However, as the piping moves away from the boiler, the fluid loses thermal energy. So, the last terminal in series might be getting 180 degrees Fahrenheit water. One would not want to throttle water back from this terminal. This terminal actually needs more water.

The circuit 372 can dynamically calculate the appropriate hot or cold set point in a variety of manners. As a first non-limiting example, the circuit 372 may utilize a look-up table that specifies a particular set-point for a particular given range. The look-up table may contain a certain set-point for each of a variety of ranges. As another example, a formula based on the supply temperature may yield a set point. Yet other manners of dynamically calculating the set point will become apparent after having read this specification.

As referenced above, in particular configurations, the circuit 372 may be simple in design and consume low amounts of electricity. In such simple configurations, the circuit 372 may have little or no diagnostic capabilities. However, in other configurations (such as those described below), the circuit 372 may have more advance capabilities—including the ability to communicate and run a variety of algorithms.

As an initial non-limiting example of a more advanced circuit design, the circuit 372 may have communicative capabilities to wirelessly receive information concerning the temperature in the supply line 110. This wireless communication may come from another circuit 372 (e.g., a neighbor circuit as will be described below) or from the supply line sensor 376, which may also be configured to communicate information wirelessly.

In particular, configurations, the return line sensor 374 and the supply line sensor 376 may be temperature sensors such as, but not limited to, thermistors. The circuit 372 may be configured to receive the respective temperatures from the supply line sensor 376 and the return line sensor 374 in any suitable manner—including wired and wireless communications. While "wires" are described, in yet other configurations, the signals may be communicated in yet other manners using other mediums for carrying modulated signals. As a non-limiting example, the supply line sensor 376 may modulate a signal down the piping itself where the signal is received by the return line sensor 374 and the return line sensor 374 communicates both temperatures to the circuit 372.

As referenced above, certain configurations may only utilize the return line sensor 374. Other configurations may utilize both the return line sensor 374 and the supply line sensor 376. Yet further configurations may utilize other types of sensors such as flow rate sensors and/or pressure sensors for additional diagnostic information. Yet further information may be gathered and/or utilized, according to embodiments of the disclosure. Further details of such other information will described with reference to FIG. 5 below.

As a simple introduction to the operation of the circuit 372, the circuit 372 receives a signal from the thermostat 160, requesting that the modulated valve component 140 either open or close. Based on additional data received from one or both of the return line sensors 374 and the supply line sensor 376 as well as other logic (discussed below), the circuit 372 sends (or doesn't send) a modified signal to the modulated valve component 140. The circuit 372 has more data to decide appropriate signaling than the thermostat and is accordingly "smarter" than the thermostat 160.

As an additional data point, in particular configurations, the retrofit system 300 may also include a feedback line 375 from the modulated valve component 140 that, among other things, informs the circuit 372 as to the degree to which the valve in the modulated valve component 140 is open or closed. In particular configurations, such additional data may be used in decision making by the circuit 372. The feedback from the valve may also be used to generate enhanced diagnostic data to report to the building maintenance team. Yet other decisional information may be utilized by the circuit 372 as will be described below.

Although the circuit 372 is described as modifying signaling form the thermostat 160 in one configuration, in other configurations the thermostat 160 may not be utilized (at all), or, alternatively only utilized for the fan 120. In such a configuration, the circuit 372 may be responsible for the signaling to the modulated valve component 140. Additionally, in particular configurations, the circuit 372 may also modify signaling to the fan 120.

Figure 4:
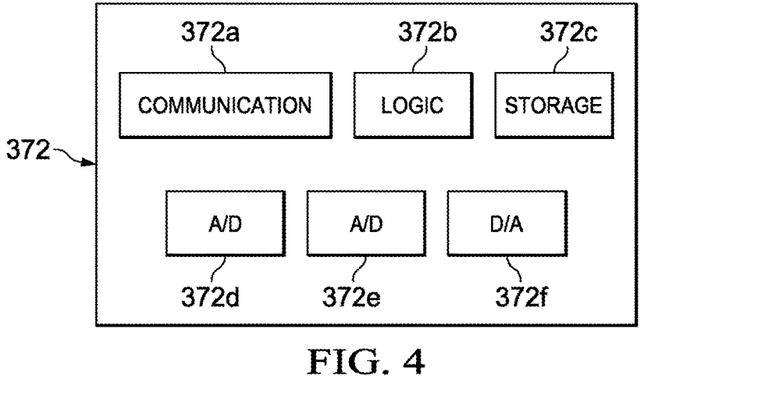
FIG. 4 show further details of the circuit, according to an embodiment of the disclosure.

FIG. 4 shows further details of the circuit 372, according to an embodiment of the disclosure. In particular configurations, the circuit 372 is a simple robust design that cost-effectively makes a system "smarter." One non-limiting example of a circuit 372 that maybe utilized according to particular embodiments is one that may be based on the Arduino Yun. The Arduino Yun has a simple microcontroller running a control loop, which has a couple of bits of I/O that communicate with much more sophisticated processors that handle communications and storage. Yet other microcontrollers and processors—more complex or less complex—may be utilized according to embodiments of the disclosure.

In the configuration of FIG. 4, the circuit 372 is shown with only a few major components: a communication module 372a, a logic component 372b, a storage component 372c, a first analog to digital converter 372d, a second analog to digital converter 372e, and a digital to analog converter 372f. Although such specific components have been provided according to one configuration, other configurations may have more, fewer, or different components parts. Additionally, for purposes of brevity, other components such as the connections between the components have not been shown. Moreover, the circuit 372 may be powered in any suitable manners such as a battery (not shown), being connected to an electrical system, or (alternatively) obtaining energy (albeit inefficiently) from the fluid being transferred through the piping.

The first and second analog to digital converters 372d, 372e generally receive input from the thermostat 160 and at least the return line sensor 374. In other configurations, additional analog to digital converters can be include to receive inputs from, for example, the supply line sensor 376 and a feedback line 375 from the modulated valve component 140. In certain configurations, for example, where the return line sensor 374 and the supply line sensor 376 are temperature sensors, a single input may be provided to the circuit 372 in the form of a signal representative of a temperature differential.

The digital to analog converter 372f converts the digital decision made by the circuit 372 for communication in an analog format to the modulated valve component 140.

The communication module 372a allows the circuit to communicate with other devices and/or other circuits 372 (as discussed with reference to FIGS. 6 and 7). Non-limiting manners of communication include both wired and wireless communications, including but not limited to, Bluetooth, Bluetooth low energy, Wi-Fi, LAN, and others. In particular configurations, the circuits 372 may utilize existing infrastructure, for example, Wi-Fi networks, LAN wiring, or even electrical power lines (modulating signals down such power lines) to communicate, for example, to another circuit 372 (as will be described below). This same capability allows the set of devices to report the status of the overall system to a building management system, or through the Internet to an energy service company or other monitoring agency. Further details of features of the communication module 372a will be described below.

The storage component 372c may store any suitable information. As a non-limiting example, the storage component 372c may store information on inputs over time received at the circuit 372 as well as decisions previously made by the circuit 372. As discussed below, the storage component 372c may also store information received from other circuits on information that such other circuits have gathered. As described herein, in particular embodiments, each circuit 372 may have all the information that is also stored at other circuits 372. Alternatively, in other configurations there may be a supervisory circuit with larger storage capacity than other circuits. The supervisory circuit may thus store everything whereas the other circuits store subsets of data, for example, possibly deleting or select older data already being stored by the supervisory circuit.

The logic component 372b, among other things, makes decisions as to what signal should be sent to the modulated valve component 140, for example, to open or close the valve and accordingly adjust the flow rate therethrough. This decision may be based on the signal from the thermostat 160, the signal from the return line sensor 374 (e.g., temperature), the signal from the supply line sensor 376 (e.g., temperature), and embedded logic on how to interpret such data. In certain configurations, the decisions may also be made based on a signal from the feedback line 375 from the modulated valve. In other configurations as will be discussed further below, the decision may also be based on historical data (e.g., stored in the storage component 372c concerning (1) decisions made by the logical component 372b, (2) prior signaling received from any of the inputs received at the circuit 372, and (3) communications received through the communication module 372a. The algorithms used by the logic component 372b may be updated over time through communication of such updates in an ad-hoc manner through the network of circuits. In particular configurations, the updates may come from an outside modelling of the system that injects updated information into the circuits that allow the system to operate more efficiently. Stated differently, the system may be continuously optimized.

As a non-limiting example of an optimization, the output decisions by the circuit 372 may be an oscillating opening and closing of the modulated valve component 140 over short periods. The circuit 372, analyzing its own prior decisions, may determine that it is more appropriate to let a slightly inefficient overflow scenario occur in the modulated valve component 140 than to continue with such oscillations—wearing down the modulate valve component 140 with no apparent benefit. Thus, according to particular configurations, the logic component 372b is a learning component that modifies subsequent behavior based on earlier observations.

As another non-limiting example of an optimization, in particular configurations, multiple circuits 372 (respectively corresponding to multiple modulated valve components 140) communicate with one another. Accordingly, one circuit 372 communicates its data to another circuit 372. A non-limiting example of communicated data may be changes in the larger system (e.g., the temperature of the supply line 110 is decreasing at other points in system). Using such communicated data (and historical recording of such data according to some configurations), a particular circuit 372 can anticipate how it needs to modify its decision. As an illustration, the circuit 372 may determine that when the temperature in the system decreases X amount, the maximized scenario for adjusting is Y which adjustments can be optimally be made now prior to the temperature of the supply line actually recording such a change.

There are also benefits that result from the communication abilities of the circuits 372. For example, rather than have a supply line sensor 376 at every terminal, sensors may be placed at select locations on the supply line and communicated to a particular circuit 372 (e.g., downstream) as an indicator of the supply temperature, which can be then used by the circuit to dynamically determine a hot or cold set point to utilize. In particular embodiments, the sensors may actually be supply line sensors 376 placed at, for example, every X number of terminals. In other embodiments, the sensors for the supply line may not be associated with any particular terminal. As appropriate, the circuit may interpret the information from such sensors. As a non-limiting example, the circuit 372 may take a reading from a sensor upstream from the terminal and another one downstream from the terminal and using a straight-line interpolation of the difference, estimate the temperature. Alternatively, in certain configurations, the temperature upstream of the terminal may simply be utilized.

The aforementioned communication of temperatures in the supply line may also be used for diagnostic purpose to inform, for example, the building owner of temperature losses in a supply line, which might be caused by reasons such as inadequate insulation. Using the information gathered, one may present how many British Thermal Units of energy is lost.

As alluded to above, the circuit 372 may have more than one processor. For example, the logic component 372b may be associated with a first processor whereas the communication module 372a may be associated with a different processor. In scenarios that utilize multiple processors, the selectively used and more energy-intensive processor (e.g., associated with communication module 372a) may be allowed to go to sleep while the less-energy intensive processor may continue to operate. Additionally, a particular module may also have more than one processor. For example, the logic component 372b may have one processor that is responsible for modifying a control signal and another processor for interpreting data. In yet alternative configurations, a processor may be split between two modules.

Non-limiting examples follow of local diagnostics are provided. In some configuration, if the inlet temperature is neither appropriate for cooling nor heating and the command signal is calling for power, the circuit can be configured to watch the inlet temperature for a pre-designated interval and signal an inlet temperature error if it does not improve in time.

In some configurations, if the control signal stays high for more a threshold time, and the delta-T remains higher than design during this interval by some ratio, then the circuit can provide an alarm that there is insufficient flow available. The circuit can also be configured to provide a different diagnosis if the inlet temperature is not adequate.

In some configurations, if the delta-t is too low and the circuit cannot find anything between low delta-t and closed, then circuit may report a poor authority scenario, in scenarios such as this, one may take the information back to a building owner to inform him that a particular valve has poor authority. If poor authority is only present some of the time, a pressure controller might be the solution. If the valve always has poor authority, the solution might be to replace the valve with a smaller one.

In yet other scenarios, group diagnostics amongst circuit can be considered. For example, a unit in error might check neighboring units for similar errors. If several nearby units also have poor authority, the problem might be that the pump is too high.

The above are non-limiting examples of types of diagnostics one can accomplish with the embodiments described herein. Yet further information and examples concerning diagnostics (including those which consider location information) will be described with reference to FIG. 6 below.

Figure 5:
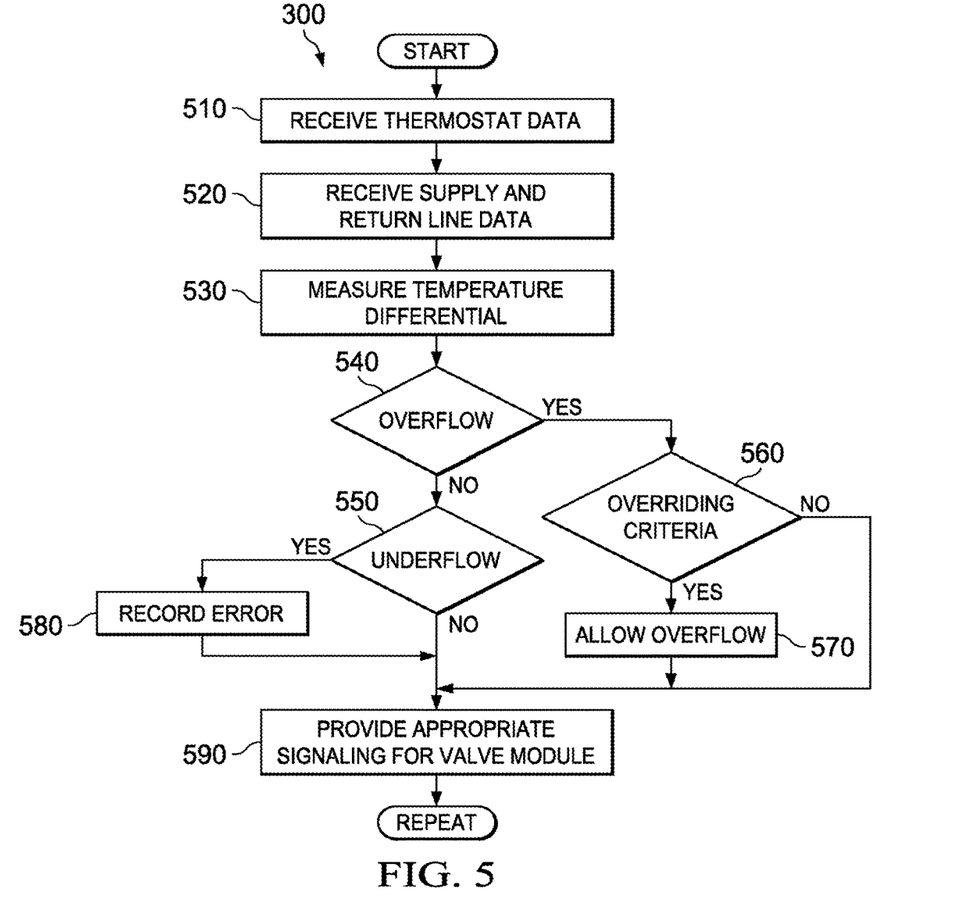
FIG. 5 illustrates an example process of the operation of the circuit 372, according to an embodiment of the disclosure.

FIG. 5 illustrates an example process 500 of the operation of the circuit 372, according to an embodiment of the disclosure and with reference to FIG. 3. Although such an example is provided, a variety of other alternative operations may also occur consistent with this disclosure.

At step 510, the circuit 372 receives data from the thermostat 160. This data may be, for example, a 0 to 10 volt signal that was originally intended for the modulated valve component 140. However, because the thermostat 160 is only watching the room temperature and is uninformed as to thermal energy in the supply and return line, the thermostat's calculation of the needed flow rate can be way off. Thus, the circuit 372 in receiving the data from the thermostat 160 is effectively intercepting such data for correction as appropriate.

In particular configurations, the data from the thermostat 160 may be analog data; however, in other configurations, the data may be supplied in other manners.

At step 520, the circuit 372 receives data from the supply line 110 and return line 150. This data may be flow and/or temperature data. In a preferred configuration, this data is temperature data as the system's design is for the transfer of thermal energy to or from a room. The data may be communicated from any suitable sensors including, but not limited to, thermistors. In FIG. 3, these sensors are shown as the return line sensor 374 and the supply line sensor 376. The data from the return line sensor 374 and the supply line sensor 376 may be analog data; however, in other configurations, the data may be supplied in other manners. Additionally, as referenced above, in certain configurations, the data communicated from a supply line may be communicatively received from at least one sensor upstream. (and in certain further configurations, another sensor downstream) of the terminal at the circuit 372.

At step 530, the circuit 372 measures the temperature differential as a basis to determine whether an overflow or underflow scenario is occurring according to decisional steps 540 and 550. As referenced above, in particular embodiments, a dynamic set point for the return line temperature can be determined based on the supply line temperature.

At decisional step 540, if no overflow scenario exists, the process 500 continues. However, if an overflow scenario is occurring, at decisional step 560 there is a consideration as to whether there is overriding criteria that should allow such an overflow. For example, as discussed above, if prior data shows multiple opening and closing oscillations in a short period of time, an overflow may be allowed. If overriding criteria exists, the process 500 may proceed to step 570 with a notation to allow an overflow to occur. If no overriding criteria exist, the signal to the control valve is modified appropriately and the process 500 may continue.

At decisional step 550, if no underflow scenario exists, the process 500 continues. However, if an underflow scenario exists and there is no manner of correcting it (e.g., the valve won't open any further), an error can be recorded at step 580 and stored, for example, in storage component 372c.

At step 590, the circuit 372 provides a signal (or not) to the modulated valve component 140, which is based on the various inputs it has received as discussed infra.

Figure 6:
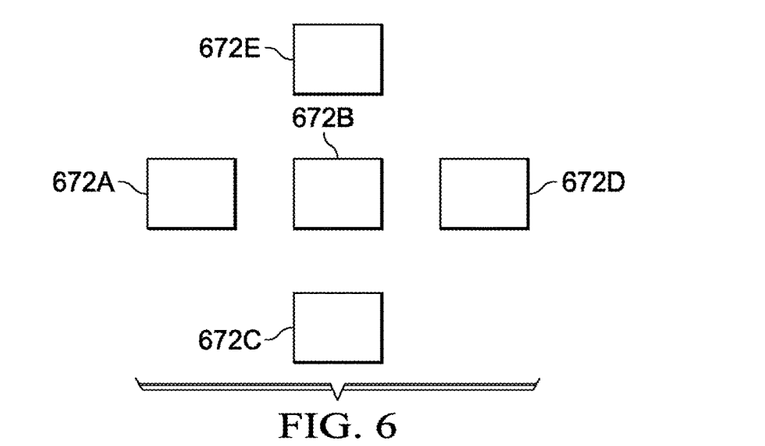
FIG. 6 illustrates an example manner of circuits communicating with one another, according to an embodiment of the disclosure, which allows communication to a user.

FIG. 6 illustrates an example manner of circuits 672 communicating with one another, according to an embodiment of the disclosure. The circuit 672 generally represent the circuit 372 described in FIG. 3; however, the circuits 672 may also be positioned inside a sensor such as the return line sensor 374, the supply line sensor 376, or any other sensor (e.g., pressure) that may seek to communicate information. In particular configurations, the circuits 672 may be part of what is sometimes referred to as a device cloud or sensor cloud whereby the circuits can be referred to as nodes.

In certain configurations, a circuit 672 may only communicate with a select number or just one neighbor circuit 672. However, each respective circuit 672 may communicate all information the circuit 672 has received with its neighbors in particular embodiments. This means that, in certain embodiments, each circuit 672 should have all the information gathered by other circuits 672. As an example, with reference to FIG. 6, circuit 672A may only be in communication with circuit 672B and not be in communication with circuits 672E, 672C, and 672D. However, circuit 672A receives information gathered by all the other circuits because circuit 672B, which communicates with circuits 672E, 672C, and 672D, relays information circuit 672B has received from such respective circuits. Similarly, circuit 672B also relays information circuit 672B has received from circuit 672A to circuits 672E, 672C, and 672D.

In particular configurations, each particular circuit 672 may have a unique identifier whereby an installer can note where the circuit 672 was installed. In other configurations, the circuits 672 may have logic onboard for self-determination of the location of the node or circuit 672 with respect to the building or other circuits 672 or node, for example as described with reference to FIG. 7.

Figure 7:
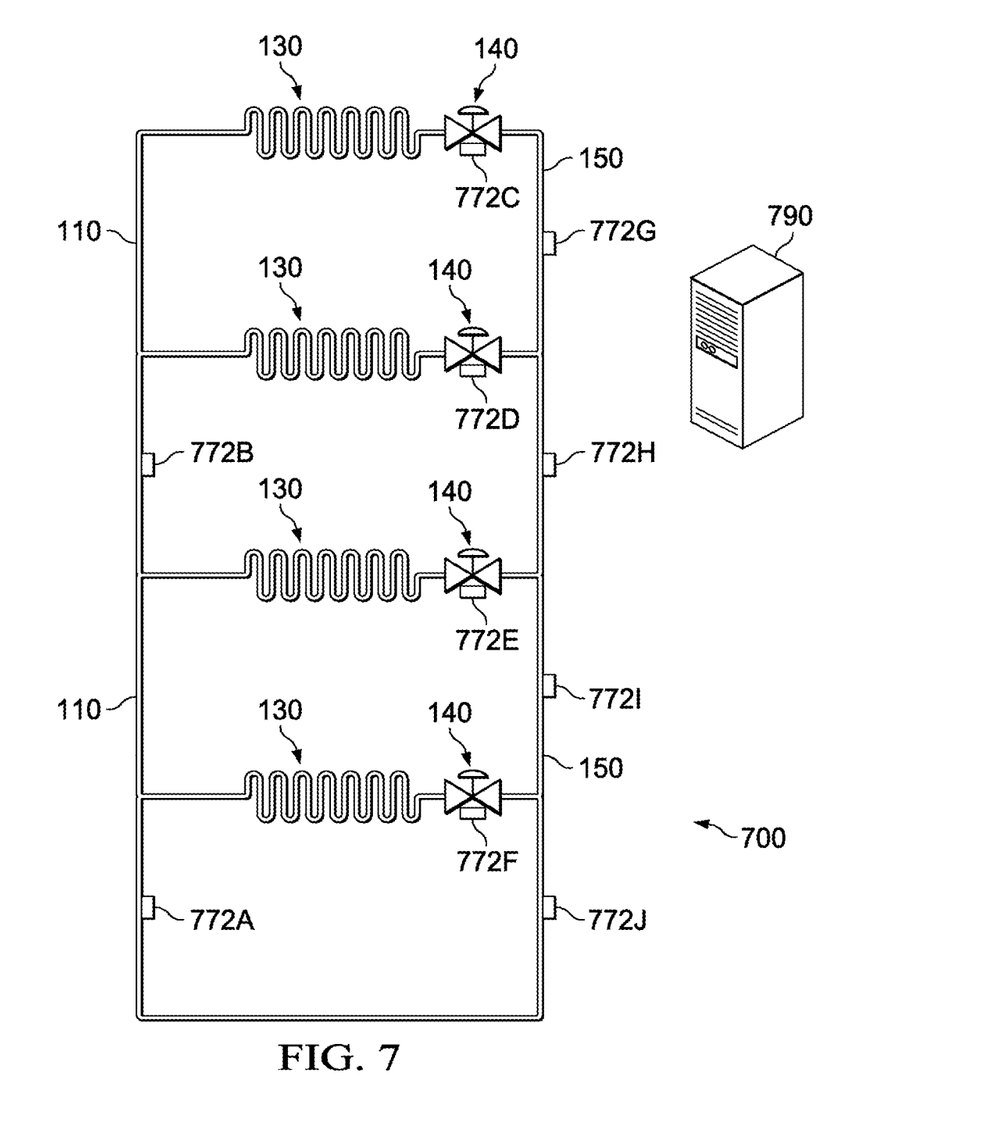
FIG. 7 illustrates a self-determination of circuits or nodes in an ad-hoc system, according to an embodiment of the disclosure.

FIG. 7 illustrates a self-determination of circuits or nodes in an ad-hoc system, according to an embodiment of the disclosure. The nodes or circuits 772 in FIG. 7 operate in generally the same manner as the circuits 672 described in FIG. 6, except that that they are shown in a fluid transfer system 700, which uses the same numbering as used in FIG. 3. For example, FIG. 7 includes coils 130, the supply line 110, the return line 150, and the modulated valve components 140. For brevity, other components have not been shown.

There are two nodes or circuits 772A, 772B that are associated with temperature sensors on the supply line. There are four nodes or circuits 772G, 772H, 772I, and 772J associated with temperature sensor on the return line 150. There are also four nodes or circuits 772C, 772D, 772E, and 772F adjacent the modulated valve components 140.

A particular circuit or node 772 may utilize a measurement of wireless signal transmission time or wireless signal strength to determine the distance from other nodes 772. As simple non-limiting examples, protocols may be utilized such that neighboring nodes all transmit a beacon signal (coupled with an identifier of the node) at the same time. The node receiving these signals can determine its location based on differences of time of arrival. As an example, node 772B can measure the time it takes for a beacon signal to arrive from nodes 772A, 772C, 772D, 772E (and possibly other nodes, depending on how many transmit).

The same may also occur in the opposite manner where a single node can inform neighboring nodes that it is transmitting a signal with the receiving nodes providing feedback to the transmitting signal as to how long the transmission took. As an example, node 772B would transmit a beacon signal and the other nodes 772A, 772C, 772D, 772E (and possibly other nodes, depending on how many receive) can measure the time it takes for that beacon signal to arrive from nodes.

Yet other wireless location determination techniques such a signal strength and angle of arrival techniques may also be utilized.

In addition to these propagated wireless electromagnetic wave techniques, a circuit or node 772 positioned on a pipe may also use the same time of signal travel time techniques or power of signal technique to send a signal on the pipe itself, which can be received by another circuit or node 772 on the pipe to provide an indicator as to the distance along the pipe or set of pipes a particular circuit or node 772 is from another circuit or node 772. For example, node 772A may propagate a signal on supply line 110 and the time is measured by node 772D.

In particular embodiments, the calculation of the location information may be determined by a computer (e.g., server 790), which may be outside the ad-hoc network. In particular embodiments, the server 790 may be the same computer analyzing the various data off-loaded from the network for modeling and optimizing as appropriate. Again, as referenced above, in particular embodiments, all of the nodes carry the information. In other embodiments, only a supervisory node carries the information.

As yet further confirmatory information; the decreasing temperatures along a line can confirm whether or not, for example, a circuit or node 772 could possibly be on a line. Stated differently, the circuits or nodes 772 may determine whether the thermal energy loss at the location of a particular circuit 772 or node is consistent with the ad-hoc location determination by the set of circuit 772 or node.

In determination of location, multiple techniques may be utilized to more accurately identify a location. Using location techniques identified herein, the ad-hoc set of circuits 772 can self-locate and identify themselves. Assuming the location information is transmitted from node to node as described above, one can visualize a 3-D model of the thermal energy transfer system within a building—along with the potential for particular alerts. Using such a self-location technique, installers of the circuits or node need spend little time being concerned as to whether they have correctly identified the location of the installed component.

Any of a variety of networking protocols (and associated algorithms) may be utilized to carry out the aforementioned communications, including those described with reference to FIGS. 6 and 7. As certain data communicated among circuits 772 may be redundant, such protocols may account for handling redundant data. Additionally, such protocols may account for scenarios where a new circuit is brought online to replace a prior circuit in the same location to, among other things, inform the new circuit of information previously gathered by the predecessor circuit, for example, historic trends. Alternatively, a new circuit 772 may be brought online, which needs to know its location. For example, with reference to FIG. 7, a new circuit can be placed on supply line 110 in the path between circuit 772B and circuit 772C before the coil 130. In such a scenario, the new circuit 772 can initiate routines within neighboring circuit 772 for discovery and then shut down or go to sleep as appropriate after discovery has occurred.

Utilizing the communication illustrated in FIGS. 6 and 7, a variety of diagnostics can occur. For example, one of the circuits 672 or nodes may be connected to remote communication devices (e.g., servers) to allow, for a remote analysis of the entire system by a bigger computer with more processing power and potential modelling capabilities, for example, server 790 of FIG. 7 (or review by humans). This may be carried out, for example, through one of circuits or nodes 672, 772 that is connected to an Internet connection. Alternatively, with reference to FIG. 6, a troubleshooter with a handheld device that communicates with the circuit 672 can walk up to any one of the circuits 672 (e.g., circuit 672A) and gather data for all the other circuits 672 (e.g., circuits 672B, 672E, 672C, and 672D). Again, this is because each circuit 672 keeps information for all other circuits 672 in some embodiments. In yet other embodiments, select supervisory nodes or circuits may have extra memory to store all information communicated by the nodes in the network whereas the other nodes might store a smaller subset, dumping select older data.

Using the intelligence of the information described above, a building owner may install the system and start making more intelligent decision for more efficient operations. For the example, based on input from circuits or nodes 672, 772, a precise location of the problem can quickly be reported, isolated, and fixed. Additionally, one may continuously optimize the system or undertake what is known as CONTINUOUS COMMISSION process of handling the thermal transfer system.

As non-limiting examples, one may determine that portions of the system have inadequate pressures or that select valves are staying open all the time. Additionally, one may determine that a temperature change is always more than it should be. Yet additionally, one may determine that there is a great unexplained thermal energy loss in a particular part of a system—suggesting inadequate insulation. The potential diagnostics based on data (including location data) gathered from the sensors is almost limitless in application.

Given such a scenario with more efficient operations, a building owner may additionally determine that the installation cost of the circuits or nodes 672, 772 will pay itself back with a certain number of months after installation because of a more efficient (and less costly operation).

It will be understood that well known processes have not been described in detail and have been omitted for brevity. Although specific steps, structures and materials may have been described, the present disclosure may not be limited to these specifics, and others may be substituted as it is well understood by those skilled in the art, and various steps may not necessarily be performed in the sequences shown.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An ad-hoc network in a system using a fluid to transfer thermal energy, the ad-hoc network comprising:
 a plurality of nodes, each node associated with at least a sensor configured to measure a temperature of the fluid or a unit configured to signal a valve to open or close, each of the nodes configured to:
  communicate with one or more of the plurality of nodes;
  communicate information received or gathered concerning an operation of the system to at least one other node;
 wherein at least one of the nodes is configured to transfer all the information gathered by the plurality of nodes to a location outside of the ad-hoc network;
 wherein each of the nodes is configured as a locating node to automatically communicate with a least some of the plurality of the nodes to allow a determination of a location of the locating node relative to such nodes;

wherein the determination of the location includes a measurement of one or more of:
  times propagated electromagnetic waves take to propagate either to or from the at least some of the plurality of nodes to the locating node,
  differences in power in a transmission of propagated electromagnetic waves either to or from at least some of the plurality of nodes to the locating node, and
  times signals along piping in a thermal transfer system take to propagate either to or from the at least some of the plurality of nodes to the locating node; and
wherein the determination of the location is confirmed by reviewing whether thermal dynamics determined to be in the system is consistent with the determined location.

2. The ad-hoc network of claim 1, wherein the determination of the location is carried out by a server located outside of the ad-hoc network.

3. The ad-hoc network of claim 1, wherein each of the nodes associated with a unit configured to signal a valve to open or close is further configured to:
  receive a temperature from a return line temperature sensor configured to measure a temperature of the fluid leaving a terminal; and
  allow a signal to be sent to the valve to open or close based on the received temperature.

4. The ad-hoc network of claim 1, wherein the system utilizes a thermostat to regulate a temperature associated with a terminal, and each of the nodes associated with a unit configured to signal a valve to open or close is further configured to:
  receive a signal from the thermostat, the signal commanding the valve to open or close;
  determine whether the temperature exceeds a set point; and
  modify the signal from the thermostat if the temperature exceeds the set point.

5. A circuit in a system using a fluid to transfer thermal energy having modulated valves controlling a flow of fluid from terminals, the circuit comprising:
  one or more modules configured to:
    receive a temperature from a return line temperature sensor configured to measure a temperature of a fluid leaving a terminal;
    allow a signal to be sent to a modulated control valve to open or close based on the received temperature; and
    communicate information concerning an operation of the circuit wirelessly to a first neighboring adjacent circuit;
  wherein the circuit is also configured as a locating circuit to automatically communicate with a least some of a plurality of other circuits to allow a determination of a location of the locating circuit relative to such circuits;
  wherein the determination of the location includes a measurement of one or more of:
    times propagated electromagnetic waves take to propagate either to or from the at least some of the plurality of circuits to the locating circuit,
    differences in power in a transmission of propagated electromagnetic waves either to or from at least some of the plurality of circuits to the locating circuit, and
    times signals along piping in a thermal transfer system take to propagate either to or from the at least some of the plurality of the circuits to the locating circuit; and
  wherein determination of the location is confirmed by reviewing whether thermal dynamics determined to be in the system is consistent with the determined location.

6. The circuit of claim 5, wherein the one or more modules in the circuit is configured to:
  receive information concerning the operation of a second neighboring adjacent circuit and communicate the information concerning the operation of the second neighboring adjacent circuit to the first neighboring adjacent circuit.

7. The circuit of claim 5, wherein the system utilizes a thermostat to regulate a temperature associated with the terminal, and the one or more modules in the circuit are further configured to:
  receive a signal from the thermostat, the signal commanding a modulated valve to open or close;
  determine whether the temperature exceeds a set point; and
  modify the signal from the thermostat if the temperature exceeds the set point.

8. The system of claim 7, wherein the one or more modules are further configured to:
  receive an indicator of a temperature of fluid delivered to the terminal; and
  dynamically change the set point based on the received indicator.

9. The circuit of claim 8, wherein the one or more modules communicatively receive the indicator from at least one sensor upstream of the terminal.

10. The circuit of claim 8, wherein the one or more modules communicatively receive the indicator from a return line temperature sensor configured to measure a temperature of fluid entering the terminal.

11. The circuit of claim 5, wherein the determination of the location is carried out by a server.

* * * * *